US010454933B2

(12) United States Patent
Chenard et al.

(10) Patent No.: US 10,454,933 B2
(45) Date of Patent: Oct. 22, 2019

(54) SYSTEM AND METHODS FOR POLICY-BASED ACTIVE DATA LOSS PREVENTION

(71) Applicant: Sequitur Labs Inc., Issaquah, WA (US)

(72) Inventors: Paul Chenard, Corvallis, OR (US); Michael Thomas Hendrick, Renton, WA (US); Julia Narvaez, Tacoma, WA (US)

(73) Assignee: Sequitur Labs, Inc., Issaquah, WA (US)

( * ) Notice: Subject to any disclaimer, the term of this patent is extended or adjusted under 35 U.S.C. 154(b) by 320 days.

(21) Appl. No.: 15/002,729

(22) Filed: Jan. 21, 2016

(65) Prior Publication Data

US 2016/0212133 A1 Jul. 21, 2016

Related U.S. Application Data

(60) Provisional application No. 62/106,078, filed on Jan. 21, 2015.

(51) Int. Cl.
*H04L 29/06* (2006.01)
(52) U.S. Cl.
CPC ............ *H04L 63/10* (2013.01); *H04L 63/20* (2013.01); *H04L 63/0428* (2013.01); *H04L 63/062* (2013.01)
(58) Field of Classification Search
CPC ...... H04L 63/10; H04L 63/20; H04L 63/0428
(Continued)

(56) References Cited

U.S. PATENT DOCUMENTS 5,881,225 A 3/1999 Worth
7,140,035 B1 11/2006 Karch
(Continued)

FOREIGN PATENT DOCUMENTS

WO PCT/US14/70897 12/2014
WO WO 2015/026389 2/2015
(Continued)

OTHER PUBLICATIONS

Derhab, "Preventive Policy Enforcement with Minimum User Intervention Against SMS Malware in Android Devices", May 3, 2015, Computer Engineering and Computer Science, pp. 479-493 (Year: 2015).*

(Continued)

*Primary Examiner* — Kenneth W Chang
*Assistant Examiner* — Gregory A Lane
(74) *Attorney, Agent, or Firm* — JRG Attorneys at Law

(57) ABSTRACT

A system and method for policy-based active Data Loss Prevention (DLP) using a two-step process to first determine if an attempt to access a data object is governed by DLP policy, and if so, then applying the DLP policy to either allow or deny access. Attempts by an agent to access, create, modify, or distribute a data object are trapped by a policy execution point. A first query determines if DLP policies govern that access request. If they do, then the metadata is decrypted to form a second query to a policy decision point to adjudicate the access request. If the access request is allowed, then a second key is provided to decrypt the data object for further processing. The system further provides for the encryption of unencrypted data objects to protect them for all future access queries.

13 Claims, 2 Drawing Sheets

(58) Field of Classification Search
USPC .................................................... 726/1, 29
See application file for complete search history.

(56) References Cited

U.S. PATENT DOCUMENTS

| | | | |
|---|---|---|---|
| 7,246,233 B2 | 7/2007 | Brabson et al. | |
| 7,640,429 B2 | 12/2009 | Huang et al. | |
| 8,127,982 B1 | 3/2012 | Casey et al. | |
| 8,255,370 B1* | 8/2012 | Zoppas | G06F 17/3051 707/694 |
| 8,285,249 B2 | 10/2012 | Baker et al. | |
| 8,463,819 B2 | 6/2013 | Shashikumar et al. | |
| 8,468,586 B2 | 6/2013 | Koottayi et al. | |
| 8,572,758 B1* | 10/2013 | Clifford | G06F 21/6218 707/741 |
| 8,935,752 B1* | 1/2015 | Chen | H04L 63/1408 726/1 |
| 8,950,005 B1* | 2/2015 | Torney | G06F 21/629 713/193 |
| 9,116,848 B1* | 8/2015 | Jordan | G06F 11/1453 |
| 2009/0089125 A1 | 4/2009 | Sultan | |
| 2009/0204785 A1 | 8/2009 | Yates, Jr. et al. | |
| 2009/0205016 A1 | 8/2009 | Milas | |
| 2010/0250370 A1 | 9/2010 | Jones et al. | |
| 2011/0209194 A1* | 8/2011 | Kennedy | G06F 21/55 726/1 |
| 2012/0216012 A1 | 8/2012 | Vorbach et al. | |
| 2013/0029653 A1 | 1/2013 | Baker et al. | |
| 2013/0191627 A1* | 7/2013 | Ylonen | H04L 63/1483 713/150 |
| 2013/0191631 A1† | 7/2013 | Ylonen et al. | |
| 2013/0246465 A1* | 9/2013 | Cambridge | H04W 12/08 707/781 |
| 2013/0253942 A1 | 9/2013 | Liu et al. | |
| 2013/0298664 A1 | 11/2013 | Gillette, II | |
| 2013/0318347 A1* | 11/2013 | Moffat | H04L 63/08 713/168 |
| 2013/0322623 A1† | 12/2013 | Rinne | |
| 2014/0020045 A1* | 1/2014 | Kabat | G06F 21/60 726/1 |
| 2014/0115659 A1 | 4/2014 | Attfield et al. | |
| 2014/0289539 A1† | 9/2014 | Osterwalder et al. | |
| 2015/0358822 A1 | 12/2015 | Hendrick et al. | |

FOREIGN PATENT DOCUMENTS

| | | |
|---|---|---|
| WO | PCT/US15/24932 | 4/2015 |
| WO | WO 2016/037048 | 3/2016 |
| WO | WO 2016057791 | 4/2016 |

OTHER PUBLICATIONS

NFC Forum (2007), "Near Field Communication and the NFC Forum: The Keys to Truly Interoperable Communications " (PDF), http://www.nfc-forum.org, retrieved Oct. 30, 2012.
Landt, Jerry (2001), "Shrouds of Time: The history of RFID", AIM, Inc, pp. 5-7.
Bluetooth Special Interest Group website, "A Look at the Basics of Bluetooth Wireless Technology", http://www.bluetooth.com/Pages/Basics.aspx, retrieved Oct. 29, 2012.
See e.g. H. Schildt, C++—The Complete Reference, 2nd edition, pp. 67-70 McGraw Hill, 1995, ISBN 0-07-882123-1.
K. Ashton, That 'Internet of Things' Thing, RFID Journal Jun. 22, 2009 (available online as of Oct. 20, 2013 at http://www.rfidjournal.com/articles/view?4986).
T. White, Hadoop—The Definitive Guide, O'Reilly, 2009, ISBN 978-0-596-52197-4.
Nakamoto, Satoshi. "Bitcoin: A peer-to-peer electronic cash system." Consulted Jan. 2012 (2008): 28. Obtained from http://www.cryptovest.co.uk/resources/Bitcoin%20paper%20Original.pdf on Apr. 6, 2015.
Bitcoin, Inc., "What are multi-signature transactions?", Obtained from http://bitcoin.stackexchange.com/questions/3718/what-are-multi-signature-transactions on Apr. 6, 2015.
Verilog, http://www.verilog.com/, accessed May 12, 2014.
IEEE P1076 Working Group, http://www.eda.org/twiki/bin/view.cgi/P1076, accessed May 12, 2014.
University of British Columbia, Department of Electrical and Computer Engineering, http://www.ece.ubc.ca/~edc/379.ian99/lectures/lec13.pdf, accessed May 12, 2014.
L. Woods, Zs. Istvan, G. Alonso. Ibex (2014) "An Intelligent Storage Engine with Support for Advanced SQL Off-loading." VLDB 2014, Hangzhou, China, Sep. 2014.
"Computer Architecture: A Quantitative Approach", Hennessy J. and Patterson, D., 5th Ed. Morgan Kaufman (2011).
"Computer Networks", Tanenbaum, A. Andrew and Wetherall, D., 5th Ed. Prentice Hall (2010).
"Prolog Programming: A First Course", Brna, P. (Mar. 5, 2001). Retrieved from <http://homepages.inf.ed.ac.uk/pbma/prologbook/> on Mar. 16, 2013.

\* cited by examiner
† cited by third party

SYSTEM AND METHODS FOR POLICY-BASED ACTIVE DATA LOSS PREVENTION

TECHNICAL FIELD

The invention relates to the technical fields of computer security, mobile computing, telecommunications, digital communications, and computer technology.

BACKGROUND OF THE INVENTION

The proliferation of mobile devices has created new problems associated with data loss that are addressed in this invention. Mobile computing devices such as mobile telephones or "handsets" with extensive computing, communication, and input and interaction capabilities ("smart phones") plus a growing array of other mobile computing devices such as touchscreen tablets, "netbooks", electronic document readers, and laptops in a wide range of sizes and with wireless and wired communication capabilities all have access to networks and private data that must be secured, yet the mobile nature of these devices creates opportunities for data leakage that did not exist previously.

The success and popularity of mobile devices has been accompanied by complementary advances in long range wireless broadband technologies such as 3G and 4G, as well as commonplace deployment of short range wireless technologies such as the 802.11 series of wireless standards and the "Bluetooth" short range wireless standard, all with considerable bandwidth. These technologies span multiple radio frequency bands and protocols. This allows mobile devices the capability of accessing and transmitting data of almost any size, thus raising the potential for breach.

Alongside the radio transceivers for such communications capabilities, many of these devices also contain an array of onboard sensors such as cameras, microphones, and GPS receivers plus other locating technologies, as well as considerable fixed-onboard and removable memory for information and multimedia storage. Furthermore, smartphones and similar devices are typically capable of running a wide variety of software applications such as browsers, e-mail clients, media players, and other applications, which in some cases may be installed by the user.

Along with the profusion of smartphones and other mobile, wireless-capable devices, there has also been a dramatic increase in the use of social networks and related technologies for information sharing for consumer as well as for professional uses. Because social network applications on mobile devices tend to use an extensive array of sensors and features, access to the applications and services has heightened concerns about individual, government, and corporate information security, and about possibilities for privacy violations and other unintended and undesirable information sharing. Furthermore, the possible professional and personal use of any given handset presents a complex set of usage contexts under which rules for device capability usage and information access need to be considered.

Beyond local concerns regarding the security of these devices for their individual users, many mobile devices are used on corporate networks or are otherwise used in corporate settings or in other cases where they may access or store sensitive corporate documents or other information. The acronym BYOD (Bring Your Own Device) is commonly used to describe the use of personal mobile devices brought in by users in business settings. One result of such BYOD activity and other mobile device usage in organizations has been a heightened awareness of the potential for leakage or other undesired exposure of sensitive, confidential, or proprietary data of the organization or other entity owning that data to parties not authorized to view or access that data. Such undesired access is referred to as "data loss". Such access incidents may even involve modification of the data by unauthorized parties, thereby compromising the integrity as well as the confidentiality of the data. As a result, the subject of Data Loss Prevention (DLP) is of increasing importance in the business world and in other areas such as government and healthcare where confidentiality of information is critical.

Such sophisticated and capable smartphones and similar devices, along with the vast amounts of information that they can contain and access, present a large set of potential security vulnerabilities (a large "attack surface") that might allow information to be accessed by malicious parties or allow undesirable use and exploitation of device capabilities for malicious purposes such as "phishing" fraud, other online fraud, or inclusion in botnets for spam transmission, denial-of-service attacks, malicious code distribution, and other undesirable activities.

Data loss need not only be malicious in nature. A corporate user may unwittingly post sensitive information to a social network, not understanding its sensitivity. Data loss may also be accidental, for example, where a user places data on a cloud service not realizing it is publicly accessible. Furthermore, compared with conventional desktop personal computers, smartphone handsets by nature are small and portable and thus more easily stolen. Portability also means that the devices will encounter security contexts that cannot be foreseen, and which may never occur again.

All of these issues indicate that privacy threats and concerns about those threats have grown significantly given the network capabilities of the devices as well as in some cases the presence of cameras, microphones, and other sensors that may capture sensitive information. While threats related to data loss can be intentional (malicious or naïve), or accidental, the damage associated with such a loss can be devastating. The mobile threat landscape is complex and presents a vast set of extant and emergent security and privacy concerns.

Existing basic DLP techniques start with firewall protections. By creating a global barrier between protected data and the outside network, data loss problems can be reduced. However, the problem with these techniques is that they focus only on preventing malicious intrusion. They do not address insider threats or accidental data leaks. More advanced techniques use learning algorithms to determine what data should and should not be released and under what conditions. The drawback is that most security contexts are complex. That complexity causes these algorithms to compute false negatives that then release data erroneously. For many industries, this is unacceptable. Finally, data loss designation techniques manually tag data that is private or ensure that only specific people are allowed to access that data. These techniques can be too restrictive and inflexible. This falls under the security paradox of too little security leads to breaches, too much security harms productivity.

There is, therefore, a growing need to improve upon not only the degree of protection provided by components and systems that enhance the security of mobile devices, but also to improve on the security of such security-related components and systems themselves, so that they and the devices and the information that they protect are more robust and are better able to withstand attempts to thwart or otherwise compromise them.

This document presents specific DLP innovations that address these issues. Specifically, what is described is a system and methods for active data loss prevention that are more robust than both the basic and advanced current best techniques but that are also far more dynamic and flexible than current designation techniques. Certain aspects of related, complementary topics to DLP such as data encryption and digital signing of data are also presented.

SUMMARY OF THE INVENTION

The invention disclosed herein describes a system and methods for active, ongoing data loss prevention for use with network-connected computing devices and digitally-stored data assets. The invention protects against unwanted disclosure of information assets owned by corporations, governments, organizations, individuals, or other entities. The invention incorporates a policy-backed, multiple-query system for active data transit monitoring and for prevention of data distribution or other data access where such distribution or access is not authorized or is otherwise not in compliance with specified policies. The system can additionally employ special encryption techniques for protection of sensitive data.

DESCRIPTION OF THE INVENTION

Figure 1:
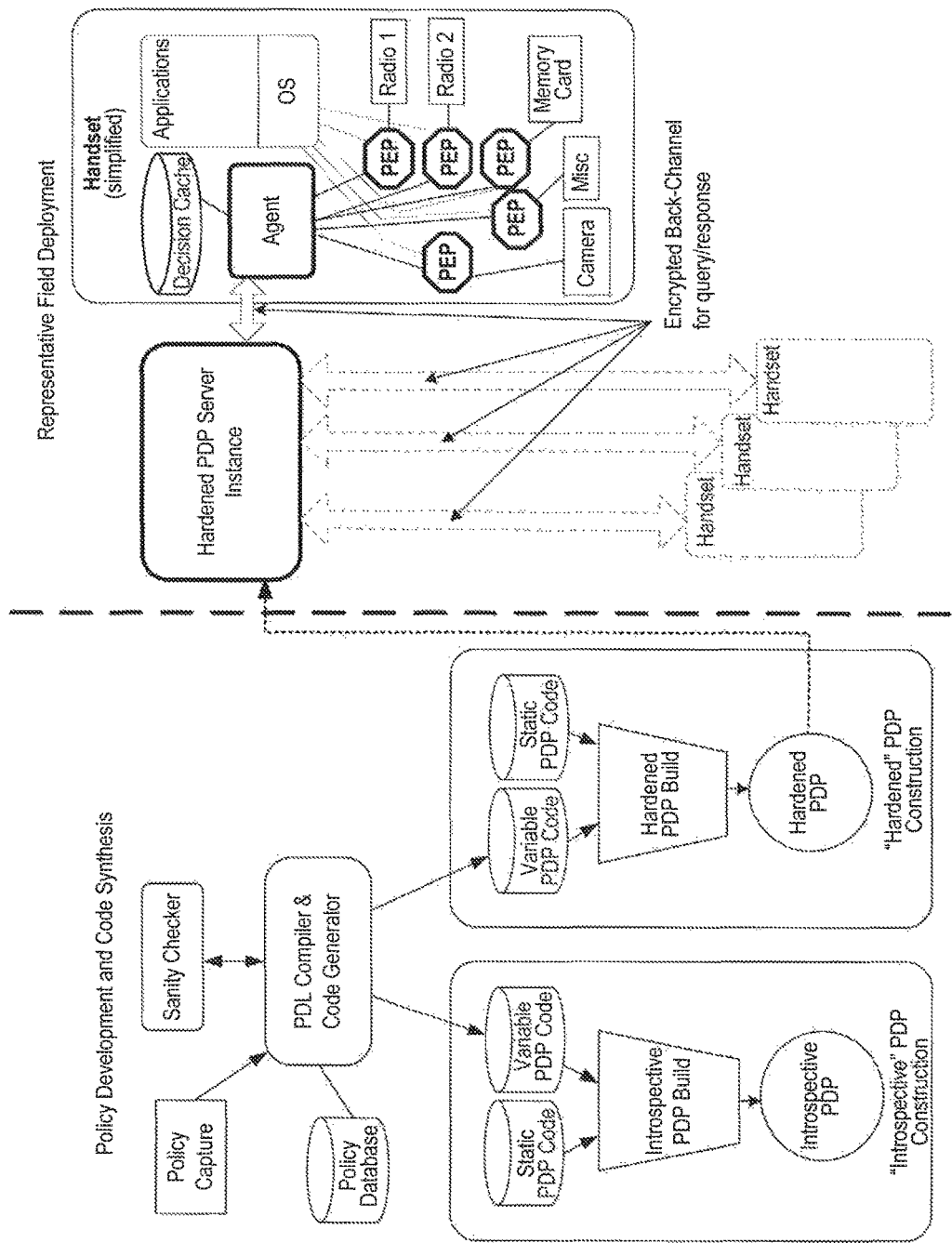
FIG. 1 is a Schematic representation of basic system.

U.S. Pat. No. 10,169,571 discloses a system for policy-based access control and management for mobile computing devices. That application is included by reference as if fully set forth herein. The basic system presented in that application is summarized in FIG. 1. The system described therein provides extensive granularity of control over permitted operations, plus network, file system, and device access on handsets controlled by the system. Furthermore, the system utilizes one or more policy decision point (PDP) servers which respond to encrypted queries from handsets controlled by a given instance of the system. These PDP servers may be remote from the handset, or may be hosted within the handset. The queries typically encapsulate requests for use of specific handset or network-accessible assets, and the PDP response to such a request is then received by the querying handset, with subsequent decisions made by the PDP then enforced at the Policy Enforcement Points (PEPs) on the handset. Note that for the purpose of brevity in the present Description, we use the term "handset" largely in regard to "smartphone" devices and similar phone devices, but we consider the invention to be generally applicable for the case of any computing device that might be a client in our system.

A policy-based system with PDPs and PEPs can be utilized for intercepting attempts to access or disseminate information that may be confidential or proprietary, or otherwise of interest to an organization, for the purpose of deciding whether such attempts should be allowed or denied, and then enforcing such decisions.

Figure 2:
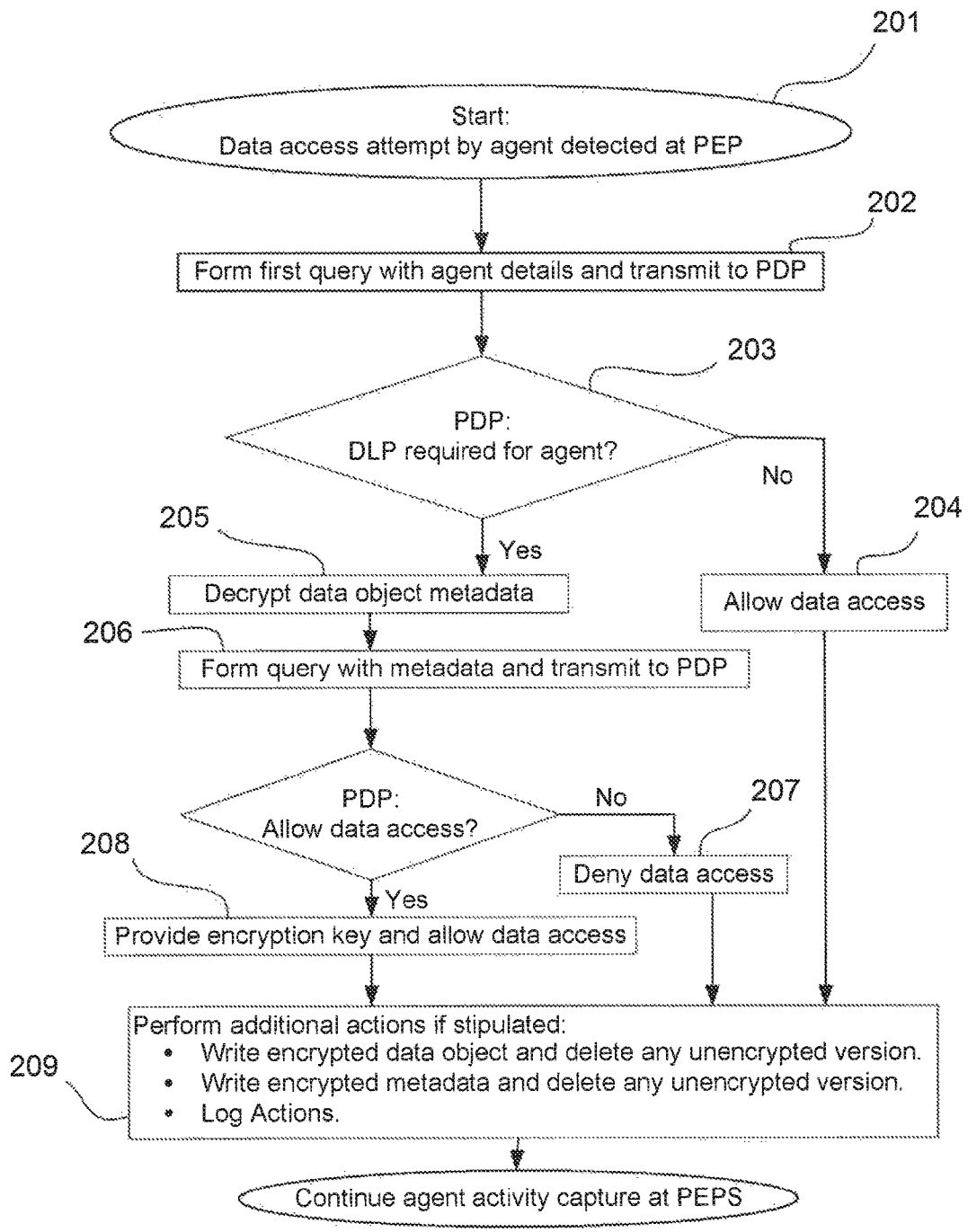
FIG. 2 is a Flowchart representing Data Loss Prevention steps.

A flowchart illustrating the operation of the system for DLP is presented in FIG. 2. The first step utilized in the system for DLP is the detection or "trapping" by a PEP of an attempt to access, create, modify, or distribute an information object by an agent that can be detected 201. The policy-based access and control mechanism described earlier is used here to define what data is to be protected and under what context. The agent may be a software application such as, but not limited to, a document editing/viewing program, a messaging program, a called subroutine, or a system process or service, or any other means of disseminating information that can be detected by a PEP. An agent may also be an embedded system or any variation thereof. Upon such detection, the PEP causes an initial policy lookup query 202 to be transmitted to a PDP to determine whether the agent requires DLP 203. Such a determination may be made by the PDP by looking up the agent in a list of known DLP-required or DLP-not-required agents, or otherwise through explicit agent specification in policy, or by other means. The agent list or lists may previously have been generated by a registration process or by other means.

Further, default cases for unknown agents may be provided for, such as a "paranoid" default case in which unknown agents are automatically assumed to require DLP. Notably, stored data objects in the system may have their contents encrypted (for extra protection against loss), and further, may have associated metadata that is also encrypted, the metadata typically being encrypted with a different decryption key than the primary object contents.

If the result of the initial query is that the agent does not require DLP invocation, then access to the object, or to create a new object, is given as appropriate to the request 204. However, if the result of the initial query is that the agent does require DLP to be invoked, then a second query is performed. For the second query, in the case of an existing object, if encrypted, the object's metadata is decrypted 205 to be used along with other information such as user information, in subsequent digital rights management (DRM) analysis or other analysis by the PDP to make an allow or deny access decision 206.

If the decision is to deny access, all access to the object is denied and if encrypted, the object content is not decrypted 207. If the decision is to allow any form of access, such access to the object (or access to create the object, in the case of a request to create a new object) is allowed, and furthermore, appropriate keys or other means for decryption of encrypted object content are provided 208. In the case of new object creation by the agent having been allowed by the PDP, created data objects are written in encrypted form and may be associated with metadata, said metadata being written encrypted with a key distinct from that used to encrypt the corresponding data object.

Finally, in the case that the system detects an attempt by an agent to access a data object, and policy determines that object to be DLP-sensitive, if the data object was previously unprotected, and if policy stipulates that a protective measure should be taken, the system will generate and store (write) an encrypted version of the object and securely delete or otherwise destroy the unencrypted version 209. In this manner, beyond DLP for the case of actual access attempts, the system is capable of catching or trapping unprotected, sensitive data and protecting it from future undesired access. Various means may also be employed within the scope of the invention for the purpose of determining whether DLP should be applied to a data object, beyond the previously described agent screening, and such means may be expressed in policies at the PDP.

In summary, the invention is a two step process where the first step determines via the policy descriptor if DLP is required to access the specific data in question, then if it is required, the second step does the determination (again via the policy descriptor) if access will be allowed.

By way of non-limiting example, direct search or indexed searching of object text content for keywords such as "medical" or "financial", or image recognition of specific image content or content likenesses in object image content, may be used to screen data objects for sensitive information, and trigger the DLP to be applied.

The system may also be used in context, where, while within the corporate firewall, certain data stores may not be transmitted externally or even stored locally on a mobile device unless certain policy requirements are met.

"Global" parameters may be set whereby Personally Identifiable Information (PII) of any kind is automatically trapped by the system to ensure that no leakage occurs.

INDUSTRIAL APPLICATION

The present invention pertains to any industry requiring computing environments where data must be secured against insider threats or accidental data leaks.

What is claimed is:

1. A system for active Data Loss Prevention (DLP) having a data processing agent that attempts to access an encrypted data object having encrypted metadata about the data object that may be governed by DLP policy, the system comprising:
   a policy enforcement point (PEP) coupled with the encrypted data object for intercepting an access request attempt by the data processing agent of the encrypted data object prior to adjudication of the access request where the interception is hidden from the data processing agent:
   a policy decision server (PDP) coupled communicatively to the PEP via an encrypted backchannel to receive the intercepted access request from the data processing agent,
   having a processor and a persistent memory configured to process a set of policy conditions that determine whether the data processing agent is governed by DLP policy and for adjudicating access by the data processing agent to the encrypted data object based on data about the data processing agent and the encrypted data object's metadata, where the adjudication is hidden from the data processing agent;
   a data loss preventer coupled to the PDP for decrypting the data objects metadata and for transmitting said decrypted metadata and the data about the data processing agent to the PDP for adjudication; and
   a responder coupled to the data loss preventer and to the PEP for transmitting the encryption key to the data object to the data processing agent when the adjudication of the PDP allows data access where the PEP enforces the adjudicated result of the PDP.

2. The system of claim 1 in which data processing agents and data objects that require a DLP determination by the PDP are registered with the PDP.

3. The system of claim 2 further including a default "paranoid" mode wherein all requests by any data processing agent to access an unknown or unregistered data object require a DLP determination.

4. The system of claim 1 in which the encrypted data object metadata is decrypted prior to transmission to the PDP for DLP access adjudication.

5. The system of claim 1 in which encryption keys for decrypting encrypted data objects are provided to the PEP only when the decision from the PDP is to allow access to the data object.

6. The system of claim 5 in which the encryption keys to decrypt the encrypted data objects are different from the encryption keys to decrypt the encrypted data object metadata.

7. The system of claim 1 where the data object is initially unencrypted, the PDP creates an encrypted version of the data object and deletes the unencrypted version.

8. The system of claim 1 where the data object metadata is initially unencrypted, the PDP creates an encrypted version of the data object metadata and deletes the unencrypted version.

9. A method for active Data Loss Prevention (DLP) having a data processing agent that attempts to access an encrypted data object having encrypted metadata about the data object that may be governed by DLP policy, comprising the steps of:
   intercepting an access request by from a data processing agent to access an encrypted data object where the interception is hidden from the data processing agent;
   querying a policy decision server (PIM) via an encrypted backchannel to determine if the encrypted data object is governed by DLP policy;
   decrypting the data object metadata when the PDP determines that the encrypted data object is governed by DLP;
   querying the PDP to determine if the data processing agent may access the data object, the query including data about the data processing agent and the decrypted metadata;
   adjudicating allowance or denial of access by the data processing agent to the data object, where the adjudication is hidden from the data processing agent; and
   providing the encryption key and allowing access to the data object when the PDP determines that the data processing agent may access the data object where the adjudicated decision of the PDP is enforced.

10. The method of claim 9 wherein querying the PDP for adjudication further includes the steps of:
    providing a first decryption key for decryption of the data object's metadata;
    decrypting the metadata using the first decryption key to create the adjudication query;
    transmitting the adjudication query that incorporates the decrypted metadata to the PDP, and determining allowance or denial of access to the data object from the DLP policy on the policy server; and
    providing a second decryption key for the decryption of the encrypted data object for access requests that are allowed by the PDP.

11. The method of claim 10 wherein the first and second encryption keys are the same.

12. The method of claim 10 in which an encrypted version of the initially unencrypted data object is created with an encryption key supplied by the PDP, and the unencrypted version of the data object is deleted.

13. The method of claim 10 in which the initially unencrypted metadata associated with the data object is encrypted with a separate encryption key to that used for the data object encryption, and the unencrypted metadata is deleted.

* * * * *

UNITED STATES PATENT AND TRADEMARK OFFICE
CERTIFICATE OF CORRECTION

PATENT NO. : 10,454,933 B2
APPLICATION NO. : 15/002729
DATED : October 22, 2019
INVENTOR(S) : Paul Chenard, Michael Thomas Hendrick and Julia Narvaez It is certified that error appears in the above-identified patent and that said Letters Patent is hereby corrected as shown below:

In the Claims

Column 5, Claim 1, Line 27, delete "attempt".
Column 6, Claim 9, Line 17, delete "by".
Column 6, Claim 9, Line 20, delete "(PIM)" and replace with --(PDP)--.

Signed and Sealed this
Seventeenth Day of December, 2019

Andrei Iancu
*Director of the United States Patent and Trademark Office*